United States Patent Office 3,346,741
Patented Oct. 10, 1967

3,346,741
RAMAN LIGHT INTENSITY AMPLIFIER
UTILISING FLUIDS
Guy Mayer and Georges Bret, Paris, France, assignors to CSF—Compagnie Generale de Telegraphie Sans Fil, a corporation of France
Filed Mar. 4, 1965, Ser. No. 437,204
Claims priority, application France, Mar. 5, 1964, 966,171
4 Claims. (Cl. 307—88.3)

The present invention relates to amplifiers for amplifying the intensity of light.

It is known to use stimulated emission sources, or lasers, for producing substantial amounts of luminous energy at a given frequency, and to use, for amplifying this energy, amplifier lasers in which the active material is a solid. The power produced by such arrangements is limited.

Actually, if the active material contains an impurity, the latter absorbs heat with attendant risks of ignition. Moreover, the greater the number of amplifying cells, the greater the divergence of the light beam, the energy being increasigly less concentrated.

It is an object of the invention to provide a luminous energy amplifier in which amplification is produced in active fluid materials, the solids which produce the beam or beams to be amplified not being subjected to the action of the amplified light beam.

The luminous energy amplifier according to the invention includes:

(a) a first oscillating cell which produces the beam of light to be amplified, this cell consisting of an active material, e.g. a solid, subjected to the action of a pumping light source and a container filled with an amplifying fluid inserted in the path of the beam produced by the active solid material, said fluid amplifying the energy, produced at frequency $F_o$ by the active material, at a frequency $F_r$ derived from its own internal molecular frequency $F_I$ by the relation $F_o-F_I=F_r$, $F_I$ being known as the Raman frequency.

(b) a number of amplifying cells each including a container filled with the same fluid as the first cell and inserted in the path of the beam of light, each of these cells being also subjected to the action of the beam produced by an active solid material of the same kind as the active material of the first cell, with substantially the same frequency $F_o$, said active solid material not being subjected to the action of the amplified beam of light.

For a better understanding of the invention and to show how the same may be carried into effect, reference will be made to the drawing accompanying the following description and in which.

Figure 1:
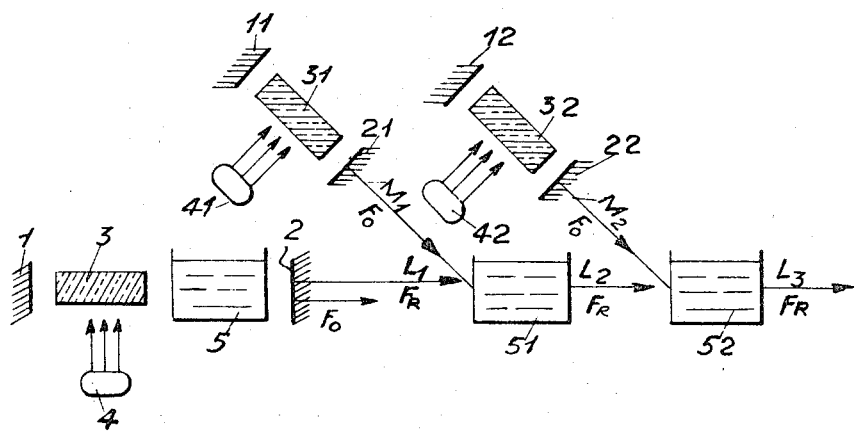
FIG. 1 shows diagrammatically an embodiment according to the invention.

FIG. 1 shows, placed between a mirror 1 and a semi-transparent mirror 2, as known in the art, an active material 3, such as ruby, subjected to the action of a pumping light source 4.

The beam of light at frequency $F_o$, generated by the laser so constructed, passes through a container 5 filled with a fluid, e.g. a liquid, but which could as well be a gas, and inserted between mirror 2 and material 3.

The arrangement of FIG. 1 includes, inserted in the path of beam $L_1$ produced by this first cell, another container 51 filled with the same fluid as container 5. This container is subjected to the combined actions of the beam $L_1$ and of a beam $M_1$ produced by a second laser, including an active material 31 of the same kind as material 3, and inserted between a mirror 21, which is semi-transparent, and a mirror 11, and subjected to the action of a pumping source 41. Material 31 is thus not placed in the path of beam $L_1$, and beam $M_1$ makes an angle $\alpha$ with beam $L_1$.

Container 51 directs a beam $L_2$ onto another identical container 52.

Material 52 is subjected to the action of a beam $M_2$ produced by active material 32 placed between the two mirrors 12 and 22, mirror 22 being semi-transparent.

The arrangement operates as follows:

Material 3 emits a first beam at a frequency $F_o$, determined by its own characteristics and by the distance between mirrors 1 and 2.

The fluid contained in container 5 amplifies the luminous energy at another frequency $F_r$ linked to frequency $F_o$ by the relation $$F_r = F_o - F_I \quad (1)$$

where $F_I$ is the Raman frequency of material 5.

The system 3–5 will emit a beam $L_1$, most of the energy of which will be produced at frequency $F_r$, frequency $F_o$ being, however, also present at the output of the system.

The resulting beam $L_1$ is applied to the input of cell 51. Through the pumping action of beam $M_1$ at frequency $F_o$, the fluid contained in container 51 amplifies the luminous energy of beam $L_1$ at frequency $F_r$ contained in beam $L_1$ and produces a second beam of light $L_2$ at frequency $F_r$ amplified with respect to beam $L_1$.

The amplification mechanism is then repeated in the following cells.

Figure 2:
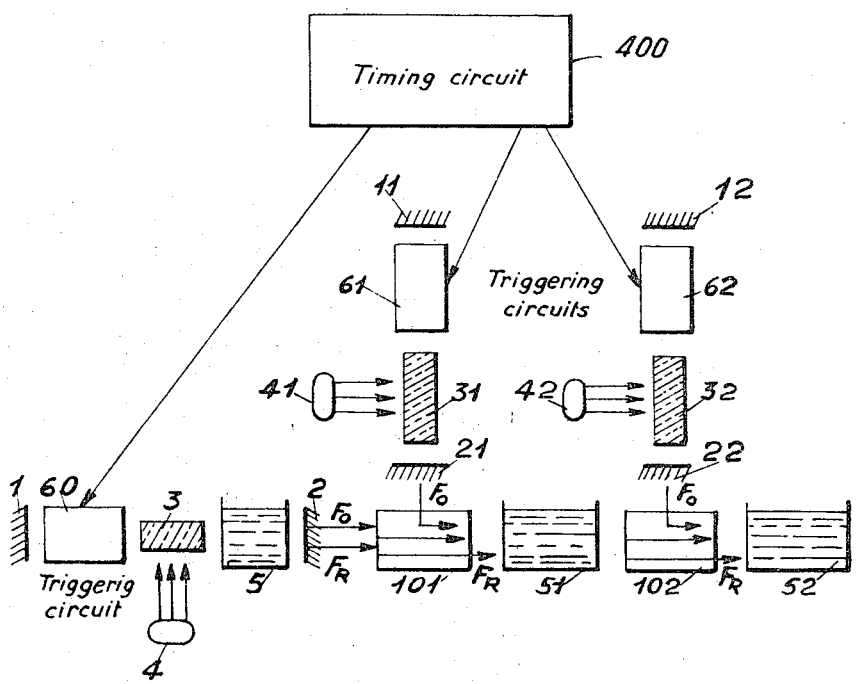
FIG. 2 shows another embodiment.

FIG. 2 shows an arrangement differing from that of FIG. 2 in that (a) control elements (mechanical, electro-optical or magneto-optical shutters) 60, 61 and 62 are associated with the various lasers for triggering them into a pulsed operation in a manner well known in the art. Element 60 to 62 are synchronised by a timing circuit 400. This arrangement ensures proper succession in time of the operation of several lasers.

(b) devices 101, 102 ... 10n such as (dielectric mirrors, prisms, etc.) are provided for directing beams $M_1$ ... $M_n$ into cells 51 ... 5n so that the latter make appropriate angles with the beams to be amplified $L_1$ ... $L_n$ and to insure suitable polarization.

For example, if the active material is ruby and the amplifying fluid is liquid nitrobenzene:

$$F_o = 4.32 \times 10^{14} \text{ C/s}$$

and $$F_r = 3.92 \times 10^{14} \text{ C/s}$$

The described arrangements have the following advantages:

(a) the solid lasers are outside the amplified beams which pass only through the fluids; since the molecules of the latter are in continuous motion, this will avoid over-heating.

(b) due to the possibility of synchronising several lasers, high peak power can be obtained.

Of course the invention is not limited to the embodiments described and shown which are given solely by way of example.

What is claimed, is:

1. A luminous energy amplifier comprising: a first active body having two ends; two first mirrors parallel to each other, near said two ends respectively; a first container containing a Raman fluid between one end and one first mirror, said one mirror being semi-transparent; a first pumping-light source for activating said body, for producing a first beam of light in a direction perpendicular to said mirrors, thus forming a first laser, the luminous energy of said first beam having a first frequency characteristic of said fluid and a second frequency characteristic of said laser; a second active body, having two further ends, situated outside the trajectory of said first beam; near said two further ends, two second mirrors parallel to each other, one of which is semi-transparent, thus forming with said second body a second laser; a second pumping-light source for activating said second body for producing a second beam of light perpendicular to said second mirrors, said second beam having said second frequency; and at least one second container, filled with said fluid; said fluid in said second container being, located outside of said lasers on the path of said first and said second beams.

2. A luminous energy amplifier comprising: a first active body having two ends; two first mirrors parallel to each other, near said two ends respectively; a first container containing a Raman fluid between one end and one first mirror, said one mirror being semi-transparent; a first pumping-light source for activating said body, for producing a first beam of light in a direction perpendicular to said mirrors, thus forming a first laser, the luminous energy of said first beam having a first frequency characteristic of said fluid and a second frequency characteristic of said laser; a second active body, having two further ends, situated outside the trajectory of said first beam, near said two further ends, two second mirrors parallel to each other, one of which is semi-transparent, thus forming with said second body a second laser; a second pumping-light source for activating said second body for producing a second beam of light perpendicular to said second mirrors, said second beam having said second frequency; at least a second container filled with said fluid; said fluid in said second container being located outside of said lasers on the path of said first beam, and means for directing towards said fluid in said second container said second beam.

3. A luminous energy amplifier comprising: a first active body having two ends; two first mirrors parallel to each other, near said two ends respectively; a first container containing a Raman fluid between one end and one first mirror, said one mirror being semi-transparent; a first pumping-light source for activating said body, for producing a first beam of light in a direction perpendicular to said mirrors, thus forming a first laser, the luminous energy of said first beam having a first frequency characteristic of said fluid and a second frequency characteristic of said laser; a second active body, having two further ends, situated outside the trajectory of said first beam, near said two further ends, two second mirrors parallel to each other, one of which is semi-transparent, thus forming with said second body a second laser; a second pumping-light source for activating said second body for producing a second beam of light perpendicular to said second mirrors, said second beam having said second frequency; at least a second container filled which said fluid; said fluid in said second container being, located outside of said lasers on the path of said first beam, and means for directing towards said fluid in said second container said second beam; respective triggering means for triggering into operation said lasers; and timing means for timing the operation of said triggering means.

4. A luminous energy source comprising a first laser for emitting a beam of light at a predetermined frequency, said laser including an active body and a semi-transparent mirror and a container containing a Raman fluid between said body and said mirror; the same fluid contained in a second container being positioned outside of said laser in the path of said beam; and a second laser for emitting a beam of light at said frequency towards said fluid in said second container.

References Cited
UNITED STATES PATENTS 3,247,459    4/1966    Van Overbeek _____ 330—4.3

OTHER REFERENCES

Article in "Electronics," Feb. 15, 1963, pp. 74, 76 and 78 (copy in Sci. Lib.).

Bloembergen, "Proc. IEEE," January 1963, pp. 124–131 (copy in Sci. Lib.).

ROY LAKE, *Primary Examiner.*

DARWIN R. HOSTETTER, *Examiner.*